3,158,528
SILICEOUS REINFORCED RESINS
Alfred Windsor Brown, Woonsocket, R.I., assignor to Owens-Corning Fiberglas Corporation, a corporation of Delaware
No Drawing. Filed June 12, 1961, Ser. No. 116,304
8 Claims. (Cl. 161—140)

The present invention relates to molding compositions or laminates comprising synthetic resins containing siliceous reinforcements and fillers and particularly to compositions of this type which contain a combination of glass and mica reinforcements and exhibit substantially universal applicability to existing usages, due to outstanding strength, electrical and aesthetic qualities.

Despite the presently extensive and ever expanding suitability of synthetic resins in satisfying the infinite variety of structural demands which are raised by our present system of rapidly developing technology, certain extensive and significant areas still resist the utilization of such materials.

Outstanding among such areas are those utilizations which require impact and tensile strengths in excess of those presently attainable through the use of synthetic resins, and a variety of electrical applications in which the general electrical qualities, and particularly the resistance to voltage, of synthetic resins are inadequate.

The utilization of siliceous fillers and reinforcements has served to partially remedy the specified inadequacies which are inherent in synthetic resins. However in doing so, processing difficulties, product detriments and a failure to completely attain the desired characteristics, have tended to counterbalance or negate the advances thus far realized.

For example, the strength defects or inadequacies of synthetic resins have been overcome to a great extent through the incorporation of fibrous glass reinforcements such as chopped fibrous glass strands or rovings, fibrous glass fabrics, and the like. The utilization of such reinforcements has brought about tremendous increases in the strength of the srtuctures formed from synthetic resins.

Similarly, the dielectric qualities of such resins have been greatly enhanced through the addition of glass flakes or platelets.

However, in the cases of both glass fibers and flakes, the processing of such products is attended by numerous difficulties and the ultimate qualities achieved leave a considerable scope for improvement.

In the case of resins provided with fibrous glass reinforcement, aesthetic and structural detriments, as well as limited suitability for electrical applications, pose major problems. Moldings formed from such compounds are characterized by an appearance marred by surface ripple, knit lines, supra-surface projection of the fibrous reinforcements, filamentization of the fibrous bundles, end-spalling, and uneven distribution of the fibrous reinforcement throughout the matrix with attendant structural weaknesses. The dielectric qualities are similarly inadequate and result in dielectric strengths ranging between 50 and 300 volts per mil.

The dielectric aspect is considerably improved in the case of glass flake reinforcements, due to the lamellar structure and barrier effect achieved through their utilization. However, such products are simultaneously characterized by poor strengths. In addition, the wetting out of the flakes by the resins is extremely difficult and the occurrence of air pockets between the opposed concave faces of the flakes is a further detriment. The poor fluid qualities of flake containing premixes or molding compositions are also non-conducive to mold injection, casting techniques and the like. While the aesthetic detriments in the case of both flake and fiber reinforced structures may be substantially remedied by post molding treatments such as sanding, polishing, painting and the like, neither type of material will provide a molded structure possessing a finished, smooth or "appliance" type of surface in the absence of post-molding treatment.

It is an object of the present invention to provide a curable molding composition which provides outstanding qualities of structural and dielectric strength, appearance, and processing ease.

A further object is the provision of reinforced plastic structures which are characterized by outstanding structural, dielectric and aesthetic qualities.

Another object is the improvement of the fluidity or pourability of resinous compositions which contain a particulate reinforcement.

The aforegoing objects are achieved by incorporating siliceous reinforcements and fillers in synthetic resins. Specifically, a composition comprising:

(1) 20-70% by weight of a synthetic resin.
(2) Siliceous reinforcements and fillers comprising:
    (a) 10-70% by weight of glass flakes.
    (b) 5-80% by weight of mica.
    (c) 0-50% by weight of fibrous glass.

is employed.

The specific formulation of the ingredients is determined by the end use for which the molding composition is intended and by the qualities sought. For example, decreasing the quantity of resin while increasing the ratio of siliceous reinforcements will, within limits, result in an increase in the structural and dielectric strengths of the material. More specific or precise characteristic or property control is achieved through the manipulation of the proportions of the siliceous materials. For example, dielectric qualities are advanced by increasing the proportion of glass flakes, while higher tensile and impact strengths result from an increase in the proportion of fibrous glass. Still further, better processing characteristics, diminution of intra-flake air or gas pockets and enhanced fluidity of the mix are attained by increasing the mica content.

It is believed that the unusual results achieved by the invention are a result of the combination of the strength and dielectric qualities imparted by the glass fibers and flakes, while the improved processing qualities and aesthetic attributes are achieved through the utilization of mica particles in combination with either or both types of glass structures, i.e., fiber and flake.

The mica particles serve to facilitate the distribution of the glass flakes and fibers, the wetting out of the fibers and flakes, and to prevent to a great extent the formation of inter-flake air or gas pockets and voids within the resinous matrix. These ultra-small mica particles create a ball bearing or roller effect which greatly enhances the distribution of the flakes and fibers by overcoming the dragging, snarling, entangling and cohering characteristics of both types of reinforcement. As a result, the fibers and flakes are uniformly intermixed, and dispersed and distributed throughout the resin. This achievement is evidenced by the laminar arrangement which is evident when a structure formed according to the invention is broken or cut and viewed in cross-section. It is further evidenced by the surfaces of the structures, which are much smoother and glossier than moldings formed from resins containing only glass flakes and/or fibers, do not contain projecting flakes, filaments or strands, and are not characterized by the visible presence of flakes and/or fibers at the area of the resin or molding surface.

The occurrence of gas pockets between opposed, concave faces of the glass flakes is also prevented by the propping effect of the small mica particles during admixture with the resin, and by the previously mentioned roller or bearing effect which operates to prevent such undesirable positioning among the flakes. The mica serves to prop open the mated edges or rims of the flakes while further serving to provide a surface upon these rims or edges which is not conducive to their mating or engagement.

Voids within the resinous matrix are also curtailed or eliminated by the tendency of the smaller mica particles to fill in or occupy the gaps or vacancies provided between the larger flake and fiber structures and to prevent the formation of voids by increasing the fluidity of the composition. The banishment of voids is accompanied not only by structural strength improvements, but also by an increase in dielectric strengths.

In addition, the incorporation of mica in the molding compositions of the invention serves to greatly improve the fire or flame resistance of the composite or reinforced structures which are yielded by these compositions.

The composite structure obtained by the prescribed utilization of siliceous reinforcements and fillers in a resinous matrix, is unique and highly desirable in the physical characteristics and product qualities which are yielded.

The flakes in their overlapped, lamellar arrangement provide excellent dielectric strengths and impenetrability or a barrier effect, while the fibrous glass yields a multi-directional strength implementation. The mica component insures the attainment of a premix possessing highly desirable characteristics of fluidity while causing the uniform distribution of the flakes and fibers throughout the resin, eliminating voids within the matrix, curtailing inter-flake gas pockets and consequently providing a smooth surface upon structures formed from the compositions.

In a preferred formulation, designed to yield optimum strength, dielectric, aesthetic and processing qualities, the ingredients are employed in the following proportional ranges which are expressed in percentages by weight:

|  | Percent |
|---|---|
| Synthetic resin | 20–70 |
| Glass flakes | 3–56 |
| Mica | 1.5–64 |
| Fibrous glass | 0–40 |

Examples illustrating preferred embodiments of the compositions of the invention are set forth below:

*Example 1*

|  | Percent |
|---|---|
| Polyester resin | 30.0 |
| Glass flakes | 35.0 |
| Mica | 8.0 |
| Fibrous glass | 8.0 |
| Benzoyl peroxide | 0.5 |
| Vinyl triethoxy silane | 0.5 |
| Zinc stearate | 1.0 |
| Alumina | 17.0 |

*Example 2*

| Polyester resin | 58.45 |
|---|---|
| Styrene | 5.85 |
| Glass flakes | 15.60 |
| Mica | 11.70 |
| Fibrous glass | 7.80 |
| Benzoyl peroxide | .45 |
| Vinyl triethoxy silane | .15 |

*Example 3*

| Polyester resin | 50.9 |
|---|---|
| Styrene | 5.2 |
| Glass flakes | 13.6 |
| Mica | 22.9 |
| Fibrous glass | 6.8 |
| Benzoyl peroxide | 0.4 |
| Vinyl triethoxy silane | 0.2 |

*Example 4*

| Polyester resin | 43.9 |
|---|---|
| Styrene | 4.5 |
| Glass flakes | 11.7 |
| Mica | 33.5 |
| Fibrous glass | 5.9 |
| Benzoyl peroxide | 0.3 |
| Vinyl triethoxy silane | 0.2 |

The compositions of the examples were formulated by first admixing the resin, styrene diluent and glass flakes with agitation, and then adding the mica and minor additives such as coupling agents, resin catalyst, flame retardants, arc suppressors and the like and continuing agitation. In the examples where fibrous glass is incorporated, ¼ to 1 inch chopped segments of fibrous glass strands were added last and with agitation. The mixing of the ingredients is preferably conducted in vacuo and the mica is preferably pre-dried. Such pre-drying may be satisfactorily achieved by oven heating the mica for twelve hours at 150° C.

Flat moldings were made from the compositions of the examples by roughly rolling out the mixes within a rubber gasket positioned between two parallel polyester films. The structures were then molded between platens for 10 minutes at 225° F. and under a pressure of 200 pounds per square inch. It should be noted that the mixes were of such a consistency as to permit conventional forming techniques such as casting, laminating, injection molding and normal roll-out methods.

The resins employed are preferably, although not necessarily, thermosetting resins such as those polyester and epoxy resins conventionally employed in molding, laminating and coating processes and compositions. Representative, although non-limitative examples of such resins are the thermosetting acrylic, epoxy, polyester, phenolic, amine aldehyde and silicone resins. However, thermoplasts such as vinyl polymers and copolymers, polyolefins, styrene polymers and copolymers, polyamides, cellulosic compounds and thermoplastic acrylates are also amenable to the methods and materials of the invention, and may be considerably enhanced thereby. For example, thermoplastic resins reinforced and filled with the siliceous materials of the invention provide excellent wire coverings, wraps, or coatings. The attributes of structural strength, dielectric strength and appearance which are achieved through the invention are correspondingly imparted to thermoplastic resins. Heat or flame resistant, or self-extinguishing resins are also highly satisfactory for the practice of the invention.

In addition, panels prepared from the siliceous reinforced resins of the invention show outstanding utility in the fabrication of printed circuit boards wherein the panels are faced with a conductive material such as copper. Not only are the electrical qualities of such composites superior, but processing qualities are extremely enhanced due to the mix fluidity which stems from the mica particles.

The glass flakes utilized are platelets such as those disclosed by U.S. 2,509,845 and 2,780,889. These flakes preferably possess a thickness of between 1 to 20 microns and a diameter between 50 microns and ¾ of an inch and are conventionally formed by forming a thin skin or film from molten glass and comminuting the film into small flakes or platelets.

The mica employed preferably has a thickness in the sub-micronic or slightly above sub-micronic ranges. The thickness of the mica particles are preferably between .2 to 3.0 microns and have a diameter between 20–150 times the thickness, or approximately 4 to 450 microns. Such particles are utilized because of the fact that the fluidity of the compositions is significantly enhanced only with small mica particles.

The fibrous glass component is preferably chopped fibrous glass strand segments having a length between ¼ to 1 inch. Such segments comprise a plurality of glass filaments normally maintained in a bundle or strand segment form, by virtue of a bonding medium. However, other fibrous glass elements such as individual filaments, chopped roving and the like may also be utilized.

The reactive diluent employed is selected for its compatibility and diluting effect upon the resin selected, such as styrene when a polyester resin is utilized. Similarly, the selection of the resin catalyst is based upon both its catalytic effect upon the resin employed and its suitability to the processing conditions to be experienced, e.g., heat activatable for high temperature molding, polymethathetic for processes conducted at room temperature.

The coupling agents utilized are non essential, but do serve to enhance the bonding between the resinous matrix and the surfaces of the glass fibers and flakes and the mica. Typical of such materials are the organosilanes such as those disclosed by U.S. 2,563,288, 2,838,754, 2,834,693 and 2,946,701, and the Werner type complexes such as those disclosed by U.S. 2,273,040, 2,356,161, 2,552,910 and 2,611,718. The organosilanes generally are preferred as the coupling agents and the specific material selected may depend upon the resin utilized. For example, vinyl silanes such as vinyl tris beta (methoxy ethoxy) silane or vinyl triethoxy silane are preferred for use in conjunction with polyester resins while amino silanes, such as gamma amino propyl triethoxy silane, are preferred with epoxy resins.

Other additives in the form of fire retardants, arc suppressors or mold release agents such as zinc stearate, alumina, antimony trioxide and the like are also desirable.

In order to test the dielectric strengths of structures prepared from the compositions of the invention, the flat moldings prepared from the compositions of Examples 2, 3 and 4 were exposed to both short term and step by step voltage breakdown tests (ASTM 4034.4.2 and 4034.4.3) to yield the following data:

| Composition | Breakdown Values (volts per mil.) | |
|---|---|---|
| | Short Term | Step by Step |
| Example 2 | 580 | 449 |
| Example 3 | 580 | 555 |
| Example 4 | 665 | 549 |

The significance of these results is apparent when the values are compared with the dielectric strengths of conventional fibrous glass reinforced resinous panels which average around 340 volts per mil.

In addition to these improved dielectric qualities, the panels produced were characterized by surfaces devoid of surface ripple, knit lines, supra-surface projection of the fibrous reinforcements, filamentization of the fibrous bundles, end spalling, and the uneven distribution of the fibrous and flake reinforcements, despite the crude molding or forming method which was employed. In box molding, the compositions yielded even superior surface finishes which appeared suitable for "appliance" type applications without the necessity for post-molding finishing treatments. Also of significance is the ease with which the compositions are processed despite their relatively high content of reinforcing and filling materials and the moisture vapor and solvent resistance and low water absorption characteristics which are exhibited by these compositions. In addition, laminates prepared from the compositions of the invention are characterized by unusually low coefficients of thermal expansion. This latter aspect is of particular significance when such structures are laminated with other materials, such as the copper facing in the case of printed circuit boards, wherein the matching of the coefficients of expansion prevents delamination upon exposure to thermal gradients.

It is apparent that novel and unusual compositions, products and improved processes, involving siliceous reinforced and filled resin compositions and structures are provided by the present invention.

It is further obvious that various changes, substitutions and alterations may be made in the compositions, methods and products of the present invention, without departing from the spirit of the invention, as defined by the following claims.

I claim:

1. A hardenable composition consisting essentially of between 20 to 70% by weight of a continuous phase (A) consisting essentially of a liquid synthetic resin, and between 30 to 80% by weight of a discontinuous phase (B) consisting essentially of between 10 to 70% by weight of glass flakes having a thickness of between 1 to 20 microns and a diameter of between 50 microns and three-quarters of an inch, and between 5 to 80% by weight of mica particles which are smaller than said glass flakes, said mica particles having a thickness of between 0.2 to 3.0 microns and a diameter of between 3 to 450 microns.

2. A composition as claimed by claim 1 in which said discontinuous phase (B) also contains no more than 50% by weight of glass fibers.

3. A composition as claimed by claim 1 in which said synthetic resin is a thermosetting resin selected from the group consisting of polyester, epoxy and phenol-formaldehyde resins.

4. A composition as claimed in claim 1 in which said mica is dry mica.

5. A reinforced structure consisting essentially of between 20 to 70% by weight of a continuouse phase (A) consisting essentially of a cured synthetic resin, and between 30 to 80% by weight of a discontinuous phase (B) consisting essentially of between 10 to 70% by weight of glass flakes having a thickness of between 1 to 20 microns and a diameter of between 50 microns and three-quarters of an inch, and between 5 to 80% by weight of mica particles which are smaller than said glass flakes, said mica particles having a thickness of between 0.2 to 3.0 microns and a diameter of between 3 to 450 microns.

6. A structure as claimed in claim 5 in which said discontinuous phase (B) also contains no more than 50% by weight of glass fibers.

7. A structure as described in claim 5 in which said synthetic resin is a thermosetting resin selected from the group consisting of polyester, epoxy and phenol-formaldehyde resins.

8. A method for preparing a reinforced structure comprising dispersing between 30 to 80% by weight of a discontinuous phase consisting essentially of between 10 to 70% by weight of glass flakes having a thickness of between 1 to 20 microns and a diameter of between 50 microns and three-quarters of an inch and between 5 to 80% by weight of mica particles which are smaller than said glass flakes, said mica particles having a thickness of between 0.2 to 3.0 microns and a diameter of between 3 to 450 microns, throughout a continuous phase comprising between 20 to 70% by weight of synthetic resin, forming the resultant composite into a desired shape and curing said synthetic resin.

References Cited in the file of this patent

UNITED STATES PATENTS

| 2,541,896 | Vasileff | Feb. 13, 1951 |
| 2,704,105 | Robinson et al. | Mar. 15, 1955 |
| 3,001,571 | Hatch | Sept. 26, 1961 |